(12) United States Patent
Drobnik

(10) Patent No.: US 10,762,558 B1
(45) Date of Patent: Sep. 1, 2020

(54) SYSTEM, METHOD, AND COMPUTER PROGRAM FOR AUTHORIZING A PAYMENT USING GESTURE DATA

(75) Inventor: Oliver Drobnik, Weistrach (AT)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 2146 days.

(21) Appl. No.: 12/353,754

(22) Filed: Jan. 14, 2009

(51) Int. Cl.
*G06Q 40/00* (2012.01)

(52) U.S. Cl.
CPC .................. *G06Q 40/00* (2013.01)

(58) Field of Classification Search
CPC ........ G06Q 40/00; G06Q 40/02; G06Q 40/04; G06Q 40/06; G06Q 40/08; G06Q 40/025; G06Q 20/10; G06Q 30/08
USPC .......................................................... 705/35
See application file for complete search history.

(56) References Cited

U.S. PATENT DOCUMENTS

| | | | | |
|---|---|---|---|---|
| 7,609,862 B2* | 10/2009 | Black | | 382/124 |
| 2005/0172148 A1 | 8/2005 | Ying | | 713/200 |
| 2007/0022469 A1* | 1/2007 | Cooper | | H04K 1/00 726/3 |
| 2007/0222746 A1* | 9/2007 | LeVine | | 345/156 |
| 2007/0276928 A1* | 11/2007 | Rhoads et al. | | 709/219 |

FOREIGN PATENT DOCUMENTS

WO   WO 00/48107   8/2000   ............. G06F 17/60

OTHER PUBLICATIONS

Rahulamathavan, Yogachandran; Phan, Raphael C.-W.; Chambers, Jonathon A.; Parish, David J.. IEEE Transactions on Affective Computing4.1: 83-92. Institute of Electrical and Electronics Engineers Inc. (Apr. 23, 2013).*

* cited by examiner

*Primary Examiner* — Gregory A Pollock
(74) *Attorney, Agent, or Firm* — Zilka-Kotab, P.C.

(57) ABSTRACT

A system, method, and computer program product include authorizing a payment using gesture data. In use, a request for a payment is received over a network from a payment provider. Additionally, gesture data is generated in response to the receipt of the request for the payment. Furthermore, the gesture data is transmitted to the payment provider over the network, for authorizing the payment.

8 Claims, 4 Drawing Sheets

SYSTEM, METHOD, AND COMPUTER PROGRAM FOR AUTHORIZING A PAYMENT USING GESTURE DATA

FIELD OF THE INVENTION

The present invention relates to payments, and more particularly to authorizing payments.

BACKGROUND

Generally, payments for goods and/or services must be authorized prior to such payments being made to a provider of the goods and/or services. For example, such authorization has traditionally included signing a credit card receipt for the purchase of a good and/or service. With the widespread availability of goods and/or services that may be purchased over a network (e.g. the Internet, etc.), various techniques have been implemented for authorizing payments over networks. Unfortunately, such techniques have exhibited various limitations.

Just by way of example, conventional techniques utilized for authorizing a payment via a network have many times required a user to log into an account capable of being utilized to make a payment (e.g. a Paypal™ account, etc.). As another example, users purchasing via online retail stores have usually been required to enter their personal information (e.g. name, address, etc.) and payment information (e.g. credit card number, etc.) into such online retail stores for making a payment, thus disclosing to the online retail stores sensitive information.

There is thus a need for addressing these and/or other issues associated with the prior art.

SUMMARY

A system, method, and computer program product are provided for authorizing a payment using gesture data. In use, a request for a payment is received over a network from a payment provider. Additionally, gesture data is generated in response to the receipt of the request for the payment. Furthermore, the gesture data is transmitted to the payment provider over the network, for authorizing the payment.

DETAILED DESCRIPTION

Figure 1:
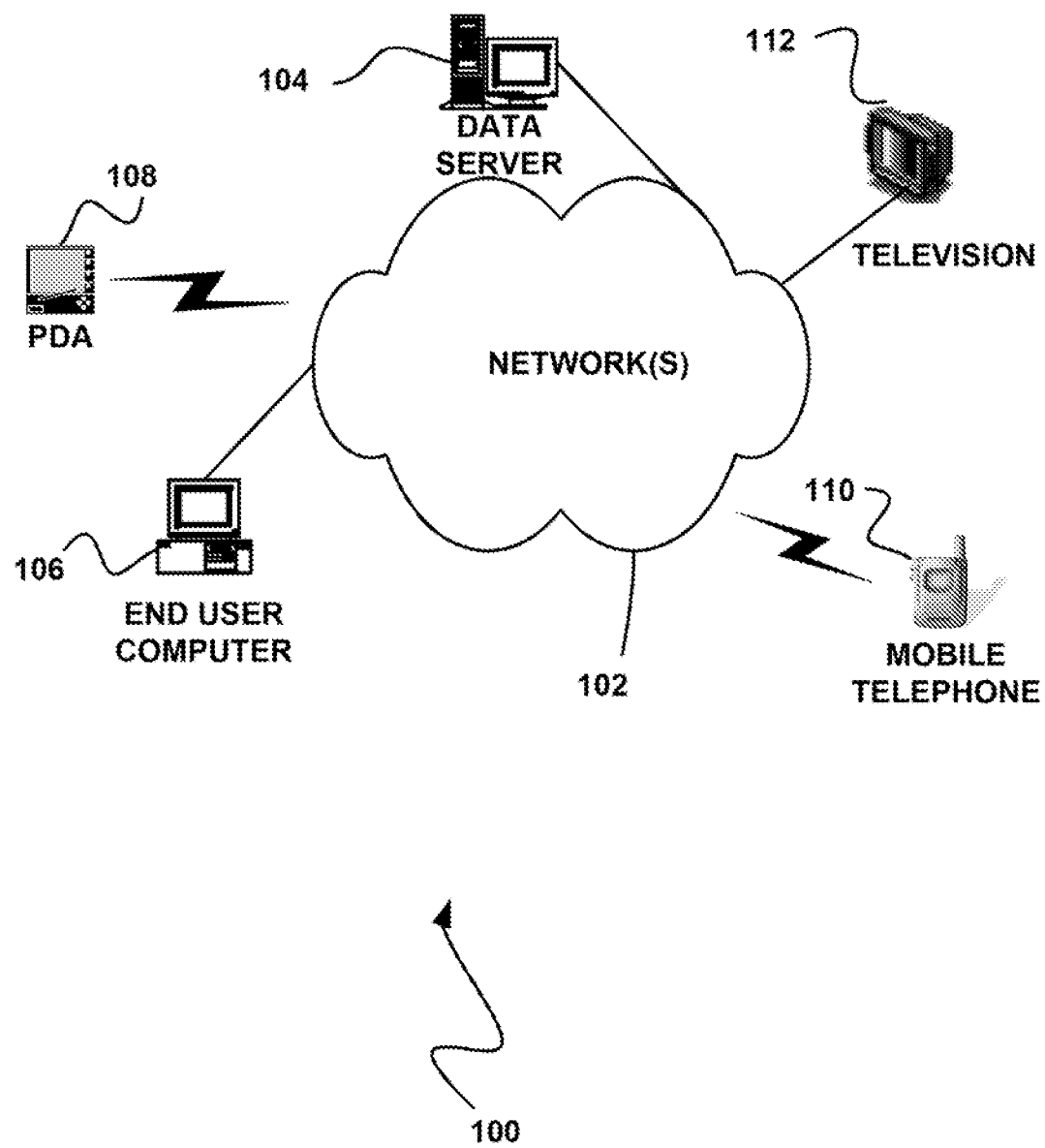
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
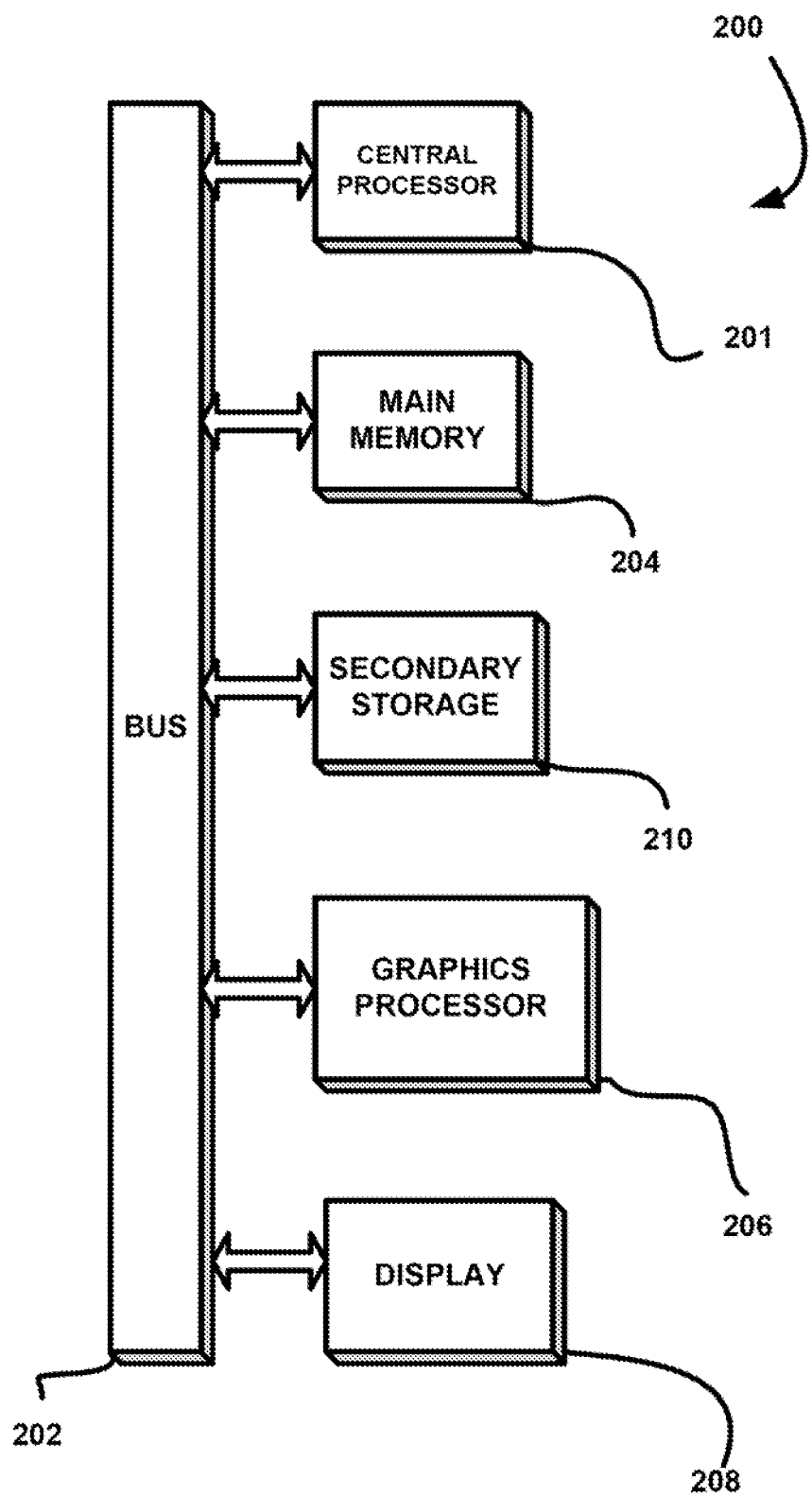
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
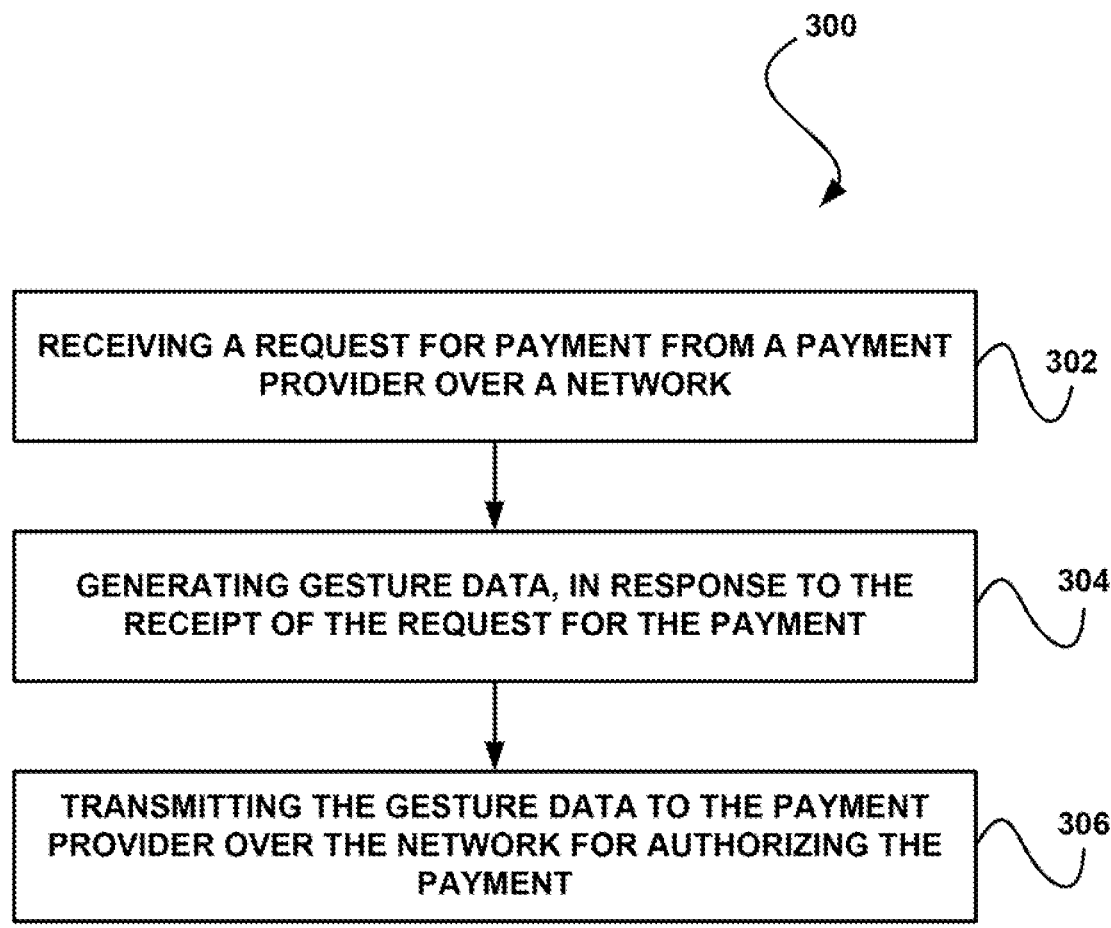
FIG. 3 illustrates a method for authorizing a payment using gesture data, in accordance with one embodiment.

FIG. 3 illustrates a method 300 for authorizing a payment using gesture data, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a request for payment is received over a network from a payment provider. With respect to the present description, the payment provider may include any system (e.g. device, logic, etc.) capable of transmitting a request for payment over a network. For example, the payment provider may include a payment authorization server (e.g. for authorizing payments).

In one embodiment, the payment provider may interface a client device and a merchant system. For example, the payment provider may send the request for payment to the client device on behalf of the merchant system, and may further authorize payment distribution to the merchant device based on a response received from the client device, as described in more detail below. In this way, the payment provider may be an intermediary between the client device and the merchant system, such that a connection between the client device and the merchant system may not necessarily be required.

To this end, the request for payment may be received by the client device over the network. In various embodiments, the network may include the Internet, a LAN, etc. As an option, the request for payment may be received via a text message, a short message service (SMS) message, an electronic mail (email) message, a web page, etc.

It should be noted that the request for payment may include any type of request that a payment be authorized. In one embodiment, the request may be for payment of a good and/or service. Optionally, the request for payment may be issued (e.g. to the client device) as a result of an initiation of a transaction involving a good and/or service. The transaction may be initiated at a physical merchant establishment (e.g. a physical retail store) or via a virtual merchant establishment (e.g. a website, etc.).

In another embodiment, the request may include a bill (e.g. invoice) for goods and/or services. The goods and/or service may include those selected by a user (e.g. of the client device) for purchase. In yet another embodiment, the request may include text and/or any other form of an instruction to the user to authorize the payment. For example, upon receipt of the request for payment by the client device, the client device may display the request to the user of the client device.

Additionally, as shown in operation 304, gesture data is generated in response to the receipt of the request for the payment. The gesture data may include any data representative of a gesture (e.g. movement, etc.), with respect to the present description. For example, the gesture data may be automatically generated (e.g. by the client device) utilizing gesture recognition of a gesture performed by the user (e.g. of the client device). Such gesture recognition may be performed by an application (e.g. installed on the client device) capable of recognizing the gesture of the user.

In one embodiment, the gesture data may only be generated if a response to the request for payment is an authorization of the payment. For example, the user may only perform the gesture, whereby the gesture data is generated, if the user authorizes the requested payment. Thus, the gesture data may be generated for authorizing the payment.

It should be noted that the gesture may include any gesture predefined to be indicative of a payment authorization. Just by way of example, predefined gesture data associated with the predefined gesture may be stored in association with an identifier of the particular user and/or client device. Accordingly, a payment authorization may only be identified if gesture data received by the client device matches the stored predefined gestured data.

Moreover, the gesture data is transmitted to the payment provider over the network for authorizing the payment, as shown in operation 306. The gesture data may be transmitted to the payment provider in any desired manner. For example, the gesture data may be transmitted to the payment provider by uploading the gesture data to the payment provider, etc.

In one embodiment, the gesture data may be automatically transmitted to the payment provider upon the generation of the gesture data. In another embodiment, the gesture data may be transmitted to the payment provider upon a selection of an option by the user (e.g. via the client device) to transmit the gesture data to the payment provider.

As an option, the gesture data may be encrypted prior to the gesture data being transmitted to the payment provider. For example, the gesture data may be encrypted by the client device. As another example, the gesture data may be encrypted using a private key of the client device (e.g. stored on the client device). In this way, the transmission of the gesture data to the payment provider may be secured. To this end, the requested payment may be authorized to the payment provider by the user via the gesture.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
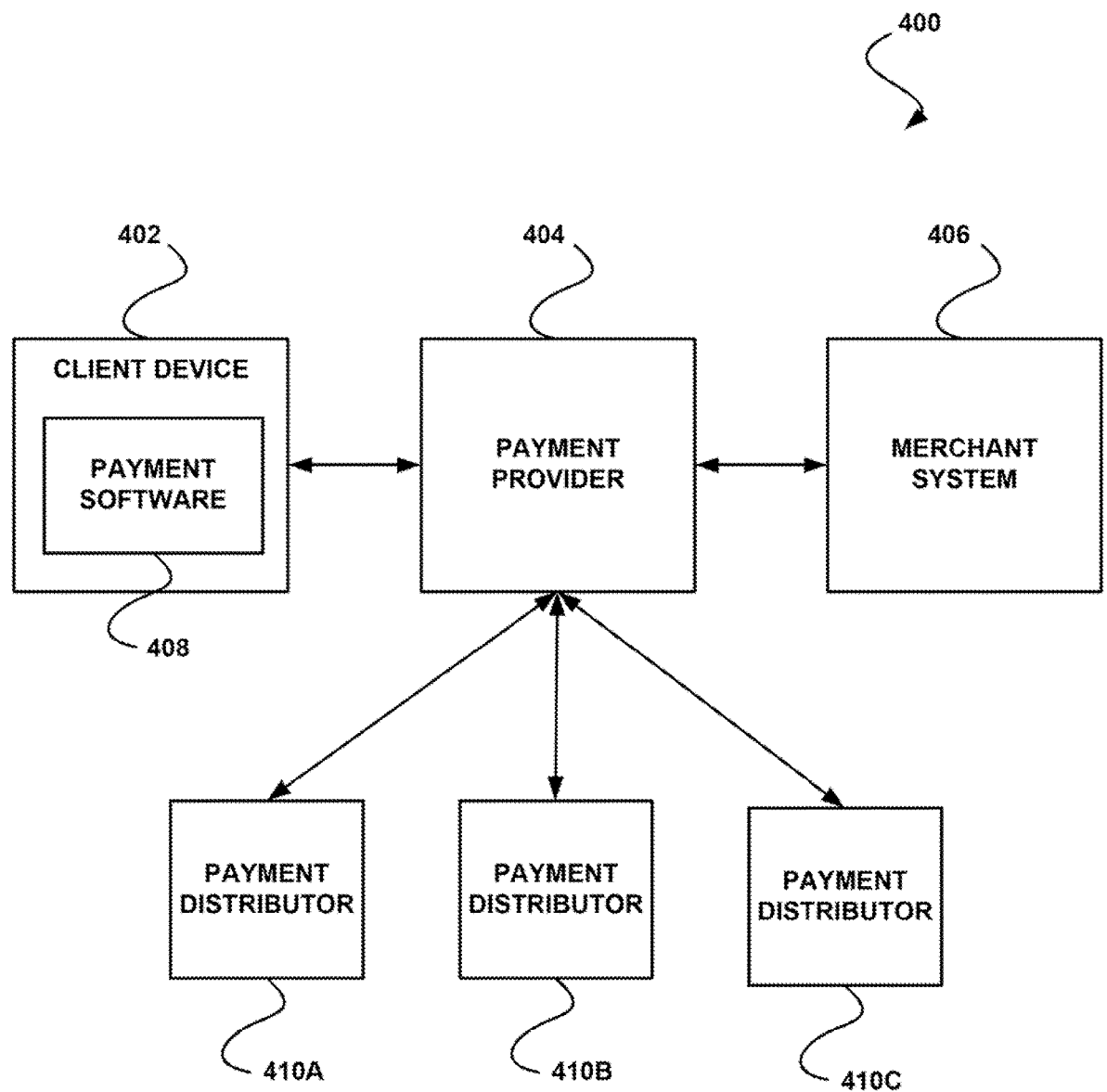
FIG. 4 illustrates a system for authorizing a payment using gesture data, in accordance with another embodiment.

FIG. 4 illustrates a system 400 for authorizing a payment using gesture data, in accordance with another embodiment. As an option, the system 400 may be implemented in the context of the details of FIGS. 1-3. Of course, however, the system 400 may be implemented in any desired environment. Further, the aforementioned definitions may equally apply to the description below.

As shown, a client device 402 is in communication with a payment provider 404. The client device 402 may include any device capable of being utilized by a user to authorize a payment via a gesture. For example, the client device 402 may have installed thereon a gesture recognition application for recognizing a gesture performed by the user. It should be noted that such client device 402 may include any of the devices described above with respect to FIGS. 1 and/or 2.

In addition, the payment provider 404 may include any system capable of authorizing a payment based the payment authorization provided by the client device 402. Just by way of example, the payment provider 404 may include the server computer described above with respect to FIG. 1. Moreover, the client device 402 and the payment provider 404 may be in communication in any desired manner.

For example, in one embodiment, the client device 402 (e.g. a mobile phone) and the payment provider 404 may be in communication via a network, such as a third generation (3G) network. Such network may include a network already utilized by the client device 402 for other purposes (e.g. wireless voice telephony, etc.). Thus, a user of the client device 402 may be prevented from necessarily being required to configure the client device 402 to access a particular network on which the payment provider 404 is located.

As also shown, the client device 402 includes payment software 408. The payment software 408 may include any application capable of being utilized to authorize a payment requested by the payment provider 404. Optionally, the client device 402 may install the payment software 408 from a memory device (e.g. CD-ROM), by downloading the payment software 408 from the payment provider 404, by downloading the payment software 408 from a website, etc. In one embodiment, the payment software 408 may report an internet protocol (IP) address via which the client device 402 can be communicated with to the payment provider 404.

In one embodiment, the client device 402 may be registered with the payment provider 404. For example, the client device 402 may be registered with the payment provider 404 upon an initial execution of the payment software 408 on the client device 402. The payment software 408 may automatically be executed upon a power-up of the client device 402, as an option. As another option, execution the payment software 408 may be manually initiated via an interface of the client device 402 by a user of the client device 402.

In other example, the client device 402 may be registered with the payment provider 404 before the client device 402 receives the payment software 408. Optionally, the client device may be required to register with the payment provider 404 in order to receive the payment software 408. In yet another example, the client device 402 may be registered with the payment provider 404 before the client device 402 performs an initial execution of the payment software 408. As an option, the client device 402 may be required to register with the payment provider 404 in order to execute the payment software 408.

The client device 402 may register with the payment provider 404 by providing to the payment provider 404 (e.g.

via the network by which the client device 402 and the payment provider 404 are in communication, via a web page of the payment provider 404, etc.) information associated therewith. For example, the client device 402 may provide to the payment provider 404 a unique identifier of the client device 402, an e-mail address of the user of the client device 402 (e.g. an e-mail address associated with the unique identifier), gesture data representative of a gesture predetermined by the user to be utilized for authorizing payments requested by the payment provider 404, etc. The payment provider 404 may store the information associated with the client device 402 (and any other client devices registered therewith) in a database.

Additionally, the payment provider 404 is in communication with a merchant system 406. The merchant system 406 may include a computer utilized by a representative of a merchant. For example, the merchant system 406 may be located in a retail store located at a physical location.

In one embodiment, the payment provider 404 and the merchant system 406 may be in communication via a network that is separate from the network utilized for communication by the payment provider 404 and the client device 402. For example, the payment provider 404 and the client device 402 may communicate via a 3G network, whereas the payment provider 404 and the merchant system 406 may communicate via an Internet connection. In this way, the client device 402 and the merchant system 406 may not necessarily be capable of direct communication. Further, by allowing the client device 402 and the merchant system 406 to communicate via the payment provider 404, such that the client device 402 and the merchant system 406 are not necessarily required to enter a network of one another, a security of the client device 402 and the merchant system 406 may be maintained.

In another embodiment, the merchant system 406 may include an interface [e.g. a hypertext transfer language (HTTP) interface, a simple object access protocol (SOAP) interface, etc.] for communicating with the payment provider 404. The interface may be integrated with cash register software of the merchant system 406 that is utilized for initiating payment for a good and/or service.

To this end, upon a user selecting to purchase a good and/or service (e.g. at a retail store including the merchant system 406), the user of the client device 402 may identify the user's e-mail address (which is registered with the payment provider 404) to the merchant system 406. For example, the user may verbally tell the e-mail address to a representative of the representative of the merchant using the merchant system 406. Of course, however, the user may identify the user's e-mail address to the merchant system 406 in any desired manner.

Upon receipt of the e-mail address, the merchant system 406 generates a payment authorization request for the good and/or service selected for purchase by the user. The payment authorization request may include a bill (e.g. an invoice) for the good and/or service, a public key signature associated with the merchant system 406 (e.g. that is particular to the merchant), and an identifier of the client device 402 (e.g. the e-mail address provided by the user of the client device 402). The payment authorization request may then be transmitted to the payment provider 404 (e.g. by pushing the payment authorization request to the payment provider 404 via the interface with the payment provider 404).

Once the payment provider 404 receives the payment authorization request, the payment provider 404 may verify an authenticity of (e.g. authorize) the merchant system 406. In one embodiment, the payment provider 404 may utilize the public key signature included in the payment authorization request to verify the authenticity of the merchant system 406. For example, the payment provider 404 may have a private key signature that corresponds to the public key signature, and thus may verify the authenticity of the merchant system 406 by verifying the public key signature with the private key signature.

Upon verifying the authenticity of the merchant system 406, the payment provider 404 may utilize the identifier of the client device 402 (the e-mail address of the client device 402) received via the payment authorization request to lookup (e.g. in the above described database) a unique identifier of the client device 402. Utilizing the unique identifier, the payment provider 404 may determine whether the payment software 408 of the client device 402 is executing on (e.g. is enabled on) the client device 402. As an option, the payment software 408 may be determined to be executing on the client device 402 if an IP address via which the client device 402 can be communicated with has been reported by the payment software 408 of the client device 402 to the payment provider 404. Determining that the payment software 408 is executing on the client device 402 may ensure that the client device 402 is listening for requests for payment from the payment provider 404.

Thus, if the payment provider 404 verifies the authenticity of the merchant system 406 and determines that the payment software 408 of the client device 402 is executing, the payment provider 404 transmits (e.g. pushes) a request for payment to the client device 402. The request for payment may include the bill for the good and/or service selected to be purchased by the user of the client device 402. In this way, the request for payment may be transmitted from the payment provider 404 to the client device 402 based on the payment authorization request received at the payment provider 404 from the merchant system 406.

Upon receipt of the request for payment, the client device 402 displays the request to the user of the client device 402 [e.g. via a graphical user interface (GUI) of the client device 402]. Accordingly, as an option, the bill for the good and/or service selected to be purchased by the user may be displayed to the user. Such bill may include an identifier of the good and/or service selected to be purchased by the user, a description of the good and/or service selected to be purchased by the user, a price of the good and/or service selected to be purchased by the user, a request that the user pay for the good and/or service selected to be purchased by the user, etc.

The user of the client device 402 may further authorize the payment for the good and/or service by performing the predetermined gesture registered with the payment provider 404. In response to the performance of the predetermined gesture, the client device 402 may generate gesture data representative of the gesture. For example, the payment software 408 of the client device 402 and/or any other application of the client device 402 may include gesture recognition capabilities for recognizing the predetermined gesture and automatically generating the gesture data. To this end, the gesture may be utilized as a non-spoofable key to authorize payment for the good and/or service.

As an option, the gesture data may be encrypted by the client device 402. For example, the gesture data may be encrypted utilizing a private key of the client device 402. Furthermore, the gesture data may be transmitted (e.g. pushed) to the payment provider 404.

The payment provider 404 may decrypt the gesture data (e.g. with a public key corresponding to the private key of the client device 402). Still yet, the authenticity of the client device 402 may be verified. For example, the authenticity of the client device 402 may be verified by comparing the gesture data (received from the client device 402 as a response to the request for payment) with gesture data provided by the client device 402 during registration of the client device 402 with the payment provider 404. Thus, if the gesture data received by the from the client device 402 as a response to the request for payment matches the gesture data provided by the client device 402 during registration of the client device 402 with the payment provider 404, the authenticity of the client device 402 may be verified. Verifying the authenticity of the client device 402 may allow the payment authorization provided from the client device 402 via the gesture data to be verified by the payment provider 404. In this way, the payment may be further authorized by the payment provider 404, based on the gesture data.

To this end, upon verification of the payment authorization provided from the client device 402, the payment provider 404 may initiate payment to the merchant for the good and/or service. As shown, the payment provider 404 may be in communication with (e.g. interface with) at least one payment distributor 410A-C (e.g. bank, credit card company, Paypal™, cellular network provider, etc.) utilized for distributing the payment as a response to the authorization of the payment. In one embodiment, the payment provider 404 may instruct a payment distributor 410A-C to make payment for the good and/or service (upon verification of the payment authorization provided from the client device 402).

As an option, the payment distributor 410A-C may be selected by the payment provider 404 for making the payment based on a preference of the user of the client device 402. Just by way of example, the user may provide a preference for one of the payment distributors 410A-C during registration of the client device 402 with the payment provider 404. Moreover, the payment distributor 410A-C instructed to make the payment may distribute the payment to the merchant (e.g. a bank account of the merchant, etc.) according to such instruction.

Still yet, upon verification of the payment authorization provided from the client device 402, the payment provider 404 may notify the merchant system 406 of the authorization of the payment. Thus, a return value for the request for payment issued via a function of the payment provider 404 to the client device 402 may include a transaction identifier string included in the notification. The transaction identifier string may optionally be a unique transaction number for the transaction of the payment for the good and/or service.

In one embodiment, the payment provider 404 may transmit a push notification of the payment authorization to the merchant system 406. In another embodiment, the merchant system 406 may poll the payment provider 404 periodically (e.g. every couple of seconds, etc.) for a status of the request for payment transmitted to the client device 402. In this way, the merchant system 406 may receive notification of the authorization of the payment, thus indicating that a payment distributor 410A-C has been instructed to make payment for the good and/or service.

In response to receipt of the notification of the authorization of the payment by the merchant system 406, the merchant system 406 may display such notification to the representative of the merchant using the merchant system 406. Accordingly, the merchant may provide the user of the client device 402 with the good and/or service for the user's own use. In this way, the transaction for the good and/or service may optionally be completed.

As an option, if the payment authorization is not provided by the client device 402 within a predefined period of time (e.g. a couple of minutes, etc.) after the request for payment has been sent from the payment provider 404 to the client device 402, the payment may be automatically determined to be unauthorized by the user of the client device 402. As a further option, the payment distributor 410A-C may not be instructed to make payment for the good and/or service.

Moreover, a notification indicating that the payment has not been authorized may be displayed via the merchant system 406 to the representative of the merchant using the merchant system 406. Accordingly, the merchant may not necessarily provide the user of the client device 402 with the good and/or service for the user's own use, and the transaction for the good and/or service may not necessarily be completed.

In one exemplary embodiment, the user may utilize the client device 402 for authorizing payments for goods and/or services, such that the user may no longer necessarily be required to carry credit cards, cash, etc. for making the payments. Eliminating use of credit cards may optionally ensure that the credit card information is not disclosed and later used in an unauthorized manner to the person to which the credit card information would otherwise be disclosed.

In another exemplary embodiment, an immediacy and security of the transaction may be provided by authorizing payments via the client device 402 while costing less than credit card transactions. Further, payment authorization via the client device 402 may made when the merchant is interfaced by the user online, via a physical retail store, etc.

Still yet, use of the gesture data for authorizing payments for goods and/or services may eliminate use of personal identification numbers (PINs) and/or passwords in authorizing the payments. In addition, since the gesture data is verified at the payment provider 404, unauthorized access to the gesture data may be prevented from occurring, and secrecy of the predetermined gesture may be maintained. Also, there may optionally be no possibility of key logging or even wireless Internet tapping as all communication with the payment provider 404 may be encrypted with public/private key pairs.

Furthermore, if the client device 402 is lost by the user, the user may simply purchase a replacement client device, install the payment software 408 thereon and link a unique identifier of the replacement client device with the user identifier (e.g. e-mail address) previously provided to with the payment provider 404 (e.g. during registration). Optionally, upon the linking of the unique identifier of the replacement client device with the user identifier previously provided to with the payment provider 404, the payment software on the lost client device may be prevented from be utilized to authorize payments, and may optionally send a notification (e.g. to the replacement client device via the payment provider 404) with the current global positioning system (GPS) coordinates of the lost client device in response to an attempted execution of the payment software on the lost client device. Having GPS available on the client device 402 may also provide for fraud prevention because the payment provider 404 may optionally verify that the client device 402 is in a predefined vicinity of the merchant system 406 that is sending the payment authorization request prior to sending the request for payment to the client device 402.

It should be noted that while only a single payment provider 404 is shown, any desired number of different payment providers may each be in communication with one or many different merchant systems. Thus, a master routing device (not shown) may optionally maintain an index of client device identifiers (e.g. e-mail addresses) and the payment providers with which they registered. In this way, the merchant system 406 may transmit a payment authorization request to the master routing device, which may identify the client device identifier included in the payment authorization request. Upon identification of the client device identifier, the master routing device may utilize the index to determine with which payment provider the client device 402 is registered, and may forward the payment authorization request to thereto. Optionally, the merchant systems may pay a fee to the payment provider 404 for each transaction.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer-readable medium, comprising computer code for:
   receiving, at a payment provider server including a hardware processor, a payment authorization request from a merchant system, the payment authorization request including a bill for a good or service, a public key signature associated with the merchant system, and an identifier of a client device;
   authorizing the merchant system, at the payment provider server, by comparing the public key signature associated with the merchant system to a private key signature stored at the payment provider server;
   determining, by the payment provider server, an internet protocol (IP) address of the client device that is associated with the identifier of the client device, in response to authorizing the merchant system;
   determining, by the payment provider server, whether payment software is currently executing on the client device by determining whether the IP address of the client device has been reported by the payment software to the payment provider server;
   transmitting a request for payment of the bill from the payment provider server to the client device in response to determining that the payment software is currently executing on the client device to cause the client device to:
     display the request for payment of the bill,
     recognize, through the payment software, a gesture of a user of the client device,
     generate, through the payment software, gesture data representative of the recognized gesture,
     encrypt the gesture data utilizing a private key of the client device, and
     transmit the encrypted gesture data to the payment provider server;
   receiving, by the payment provider service from the client device, the encrypted gesture data;
   decrypting the gesture data at the payment provider server, utilizing a public key corresponding to the private key of the client device;
   verifying an authenticity of the client device and authorization of the payment of the bill at the payment provider server by determining whether the decrypted gesture data matches gesture data provided to the payment provider server by the client device during a registration of the client device; and
   initiating the payment, by the payment provider server, to the merchant system, upon determining that the decrypted gesture data matches the gesture data provided to the payment provider server by the client device during the registration of the client device.

2. The computer program of claim 1, wherein the payment provider server includes a payment authorization server.

3. The computer program of claim 1, wherein the payment provider server interfaces at least one payment distributor utilized for distributing the payment.

4. The computer program of claim 1, wherein the client device and the merchant system are in communication with the payment provider server via separate networks.

5. The computer program of claim 1, wherein the payment provider server notifies the merchant system of the authorization of the payment.

6. A method, comprising:
   receiving at a payment provider server including a hardware processor, a payment authorization request from a merchant system, the payment authorization request including a bill for a good or service, a public key signature associated with the merchant system, and an identifier of a client device;
   authorizing the merchant system at the payment provider server by comparing the public key signature associated with the merchant system to a private key signature stored at the payment provider server;
   determining, by the payment provider server, an internet protocol (IP) address of the client device that is associated with the identifier of the client device, in response to authorizing the merchant system;
   determining, by the payment provider server, whether payment software is currently executing on the client device by determining whether the IP address of the client device has been reported by the payment software to the payment provider server;
   transmitting a request for payment of the bill from the payment provider server to the client device in response to determining that the payment software is currently executing on the client device to cause the client device to:
     display the request for payment of the bill,
     recognize, through the payment software, a gesture of a user of the client device,
     generate, through the payment software, gesture data representative of the recognized gesture,
     encrypt the gesture data utilizing a private key of the client device, and
     transmit the encrypted gesture data to the payment provider server;
   receiving, by the payment provider service from the client device, the encrypted gesture data;
   decrypting the gesture data at the payment provider server, utilizing a public key corresponding to the private key of the client device;
   verifying an authenticity of the client device and authorization of the payment of the bill at the payment provider server by determining whether the decrypted gesture data matches gesture data provided to the payment provider server by the client device during a registration of the client device; and
   initiating the payment, by the payment provider server to the merchant system, upon determining that the decrypted gesture data matches the gesture data provided to the payment provider server by the client device during the registration of the client device.

7. A system, comprising:

a memory of a payment provider server storing computer code; and a hardware processor of the payment provider server configured to execute the computer code stored in the memory for:

receiving, at the payment provider server a payment authorization request from a merchant system, the payment authorization request including a bill for a good or service, a public key signature associated with the merchant system, and an identifier of a client device;

authorizing the merchant system at the payment provider server by comparing the public key signature associated with the merchant system to a private key signature stored at the payment provider server;

determining, by the payment provider server, an internet protocol (IP) address of the client device that is associated with the identifier of the client device, in response to authorizing the merchant system;

determining, by the payment provider server, whether payment software is currently executing on the client device by determining whether the IP address of the client device has been reported by the payment software to the payment provider server;

transmitting a request for payment of the bill from the payment provider server to the client device in response to determining that the payment software is currently executing on the client device to cause the client device to:

display the request for payment of the bill, recognize, through the payment software, a gesture of a user of the client device, generate, through the payment software, gesture data representative of the recognized gesture, encrypt the gesture data utilizing a private key of the client device, and transmit the encrypted gesture data to the payment provider server;

receiving, by the payment provider service from the client device, the encrypted gesture data;

decrypting the gesture data at the payment provider server, utilizing a public key corresponding to the private key of the client device;

verifying an authenticity of the client device and authorization of the payment of the bill at the payment provider server by determining whether the decrypted gesture data matches gesture data provided to the payment provider server by the client device during a registration of the client device; and initiating the payment, by the payment provider server, to the merchant system, upon determining that the decrypted gesture data matches the gesture data provided to the payment provider server by the client device during the registration of the client device.

8. The system of claim 7, wherein the hardware processor is in coupled to the memory via a bus.

* * * * *

UNITED STATES PATENT AND TRADEMARK OFFICE
CERTIFICATE OF CORRECTION

PATENT NO. : 10,762,558 B1
APPLICATION NO. : 12/353754
DATED : September 1, 2020
INVENTOR(S) : Oliver Drobnik Page 1 of 1

It is certified that error appears in the above-identified patent and that said Letters Patent is hereby corrected as shown below:

In the Claims

Column 10, Line 25-26, Claim 6, please replace "system at the payment provider server" with --system, at the payment provider server,--

Column 11, Line 7, Claim 7, please replace "server a" with --server, a--

Column 11, Line 13-14, Claim 7, please replace "system at the payment provider server" with --system, at the payment provider server,--

Signed and Sealed this
Sixth Day of January, 2026

John A. Squires
*Director of the United States Patent and Trademark Office*